(12) United States Patent
Metzner

(10) Patent No.: US 8,061,508 B2
(45) Date of Patent: Nov. 22, 2011

(54) SECONDARY CONVEYOR BELT CLEANER AND MOUNTING SYSTEM THEREFOR

(76) Inventor: William Metzner, Martins Ferry, OH (US)

( * ) Notice: Subject to any disclaimer, the term of this patent is extended or adjusted under 35 U.S.C. 154(b) by 217 days.

(21) Appl. No.: 12/287,496

(22) Filed: Oct. 9, 2008

(65) Prior Publication Data

US 2009/0133990 A1   May 28, 2009

Related U.S. Application Data

(60) Provisional application No. 60/998,182, filed on Oct. 9, 2007.

(51) Int. Cl.
*B65G 45/12* (2006.01)
(52) U.S. Cl. .......................... 198/497; 198/498
(58) Field of Classification Search .............. 198/493, 198/494, 497–499
See application file for complete search history.

(56) References Cited

U.S. PATENT DOCUMENTS

| | | | | |
|---|---|---|---|---|
| 1,330,967 A * | 2/1920 | Winters | ...................... | 198/498 |
| 2,551,123 A * | 5/1951 | Heller | .......................... | 198/499 |
| 3,841,470 A * | 10/1974 | Meguro | ....................... | 198/499 |
| 3,971,086 A * | 7/1976 | Stanaitis | ........................... | 470/4 |
| 4,036,351 A * | 7/1977 | Reiter | ............................. | 198/499 |
| 4,249,650 A * | 2/1981 | Stahura | .......................... | 198/499 |
| 4,541,523 A * | 9/1985 | Stockton | ....................... | 198/499 |
| 4,633,999 A * | 1/1987 | Perneczky | ..................... | 198/499 |
| 4,773,526 A * | 9/1988 | Slikker | ........................... | 198/497 |
| 5,339,947 A * | 8/1994 | Campanile | ..................... | 198/499 |
| 5,975,281 A * | 11/1999 | Yoshizako et al. | ............. | 198/499 |
| 6,095,318 A * | 8/2000 | Brink | ............................. | 198/499 |
| 6,279,727 B1 * | 8/2001 | Waalkes et al. | ................ | 198/499 |
| 6,820,734 B1 * | 11/2004 | Gilbert et al. | ................. | 198/499 |
| 6,834,469 B2 * | 12/2004 | Fingerson et al. | ........... | 52/651.02 |
| 6,874,616 B2 * | 4/2005 | DeVries et al. | ................ | 198/499 |
| 7,308,980 B2 * | 12/2007 | Peterson et al. | ............... | 198/617 |

FOREIGN PATENT DOCUMENTS

GB          1579475 A  * 11/1980
GB          2165809 A  *  4/1986

* cited by examiner

*Primary Examiner* — Gene Crawford
*Assistant Examiner* — William R Harp
(74) *Attorney, Agent, or Firm* — David G. Oberdick

(57) ABSTRACT

Secondary system for cleaning a belt running between conveyor pulleys comprised of a frame bar on which cleaning blades are mounted, two bracket assemblies to which the frame bar is adjustably mounted, and an adjustment system mounted on the external sides of the bracket assemblies. Bracket assemblies each can include a pair of slotted arms over which two or more clamps are joined together. Each bracket assembly can include an inner tube member that telescopes into two outer tube members and an upper member that can be adjustably clamped to the inner tube and a lower tube member to which the frame bar is mounted and attached to the upper member by the adjustment system. Frame bar and bracket assemblies have rectangular cross-section so that when mounted to each other, rotational movement of frame bar about its longitudinal axis is prohibited. This rotational prohibition is independent from the adjustment system.

20 Claims, 14 Drawing Sheets

SECONDARY CONVEYOR BELT CLEANER AND MOUNTING SYSTEM THEREFOR

CROSS-REFERENCE TO RELATED APPLICATION

This application claims priority under 35 U.S.C. §119(e) to Provisional Application Ser. No. 60/998,182, filed Oct. 9, 2007, incorporated by reference in its entirety.

FIELD OF THE INVENTION

The present invention relates to belt cleaning systems for conveyor belts and, particularly, to secondary belt cleaning systems. More particularly, this invention relates to an improved mounting system for a secondary belt cleaner that does not require a twister or "tensioner" for holding the cleaner blade or blades firmly against a moving conveyor belt. The mounting system of this invention places fine tuning adjusters on the outside or outer edges of a belt cleaner, much more accessible than the interior adjustment means of many prior art cleaners.

BACKGROUND OF THE INVENTION

It is known to use scraping style cleaners for a conveyor belt to remove debris and other materials from the belt. Such belts function in different capacities depending on their relative belt positions. Those belt cleaners positioned along the forward most belt head pulley are called primary belt cleaners. They are the first in line, meant to remove most of the "carry back" from the belt proper and are considered the most efficient means for effecting conveyor belt cleaning. Dual primary belt cleaners have been conceived and installed for some belt cleaning applications.

Further along the conveyor proper, past the belt head pulley, additional (or supplemental) belt cleaning can be accomplished with secondary cleaning systems. Such systems employ one or more metal blade components for removing additional carry back from the conveyor belt return, typically on the underside of same. It is also known to employ additional (tertiary) belt cleaners, belt wipers and/or other belt scraper devices as conditions may require.

For most secondary belt cleaner applications, it is critical that the blade components be held, in tension, against the moving conveyor for properly and effectively cleaning same. Numerous tensioner systems have been developed for applying a continuous, spring-like pressure (or tension) of the blades against the belt being cleaned. While most secondary cleaning systems today include an array of metal blades, the metal components of same are usually buffered by, or cushioned in a resilient, blade-holding base of rubber or other material for lessening rigid impact with the belt. Secondary cleaning systems may supplement the cleaning from one or more primary systems. But none of these systems should be so stiff as to risk damaging the belts they are meant to clean "near continuously".

In many situations, the means for holding a secondary system firmly against the conveyor need not be overly sophisticated. Some elaborate tensioner devices are mechanically complex, costly to install, maintain and replace, and vulnerable to attack from the elements.

Accordingly, there is a need for a secondary conveyor belt cleaner that is better optimized for cleaning efficiency and cleaning blade wear resistance while not requiring complex cleaner mounting mechanicals. Further, a less sophisticated mounting means should apply proper blade cleaning pressures to the belt it is installed against, but without elaborate, springs and other tensioning systems. Such a simpler, yet still efficient mounting system should be capable of installation from multiple directions, for push-up or pull-up mounting. It would be beneficial if a simple secondary belt mounting means was conceived which could be readily adjusted from at or near the outer edges, rather than the more tedious, inside adjustments required by other secondary belt mechanisms. Preferably, this mounting system is used in conjunction with a rectangular (rather than circular) cleaning blade frame with multiple blade mounting crossbar members extending upwardly from one side of same.

SUMMARY OF THE INVENTION

In accordance with one preferred embodiment, a secondary belt cleaner and mount is provided having a main blade frame held firmly against the conveyor at opposite ends with side brackets. In one embodiment, each side bracket has two or more slotted arms extending from a base, either upwardly or downwardly depending on the direction of cleaner installation against the belt. These slotted arms are held together, on both sides of the conveyor, with at least two adjustable C-clamps. A first C-clamp (on each side) is bolted through a slot in the side bracket arm before the main cleaning blade frame is positioned against the conveyor belt and over both first C-clamps. A second (usually lower) C-clamp, also on both sides of the conveyor, fits around both slotted arms behind (and usually, below) the first "upper" C-clamp. These second C-clamps, like the first, get bolted through the slotted arms to the mounting means proper.

Preferably, both C-clamps are open-ended but still more box-shaped than curvilinear. With at least three, substantially straight sides, the C-clamps can be pushed into place from the sides of the slotted arms to which they will be bolted. Opposite the "open" end of such C-clamps, there is an outwardly projecting lip or ledge. The lip/ledge to the first and second C-clamps are meant to align when duly installed over their respective slotted arms. Once aligned, the outer lip/ledges of the first and second C-clamps can be interconnected by still other, finely adjustable means. In one particular embodiment, one of the two C-clamp lip/ledges has a threaded aperture through which a bolt passes before contacting the non-apertured lip/ledge of the other partnered C-clamp lip/ledge. In this manner, by rotating the threaded bolt, in one direction or the other, the spacing between C-clamps of this secondary cleaner mount can be finely adjusted affecting a better positioning of the main blade frame against the conveyor belt, from either or both sides.

In another embodiment, the slotted arms and C-clamp members are replaced by a pair of telescoping structural tube bracket assemblies that each are slotted through two opposing side for interaction with a bolt that holds outer tube members to an inner tube member and allows for adjustment of frame positioning insofar as the frame is mounted on the lower, outer tube member. In addition, the upper and lower outer tube members of the telescoping structuring tube bracket assembly can be adjusted in respect to each other by a bolt or screw adjustment system that interacts with both outer tube members. The main blade frame is attached to the lower external tube and can be adjusted as the position of the two outer tube members is adjusted.

In addition, for less rotational possibilities within this invention or a typical clamped and tensioned secondary cleaner mount, preferred embodiments of this invention include a rectangular, more preferably square-shaped, cleaning blade frame. For better engagement with the conveyor belt being cleaned, this rectangular blade frame has two or more mounting crossbar connectors extending upwardly and outwardly from one side. Such mounting is significantly improved in terms of blade contact and sweep when compared with the circular blade frames of the prior art from which only one crossbar connector projects upwardly and outwardly. A main advantage of mounting rubber blades mount between two crossbar connectors atop the blade frame, as opposed to bolting through only one upwardly extended crossbar, is that prior art single connector arrangements apply less forces against the conveyor for fine adjustment at the point of tangency, i.e., where the belt leaves the head (or front) pulley. Preferably, the blades that perform secondary cleaning should push into the conveyor belt about 1/8" inch or more. Once the conveyor begins running, the cleaning blades will flex back and forth via their rubber mounts. On a single crossbar connector, these blades may fold over too often and too easily. And with excessive "fold over" and "over movement", the rubber holders of a one blade connector frame are more prone to crack at their weakest points rendering them useless for continuous conveyor belt cleaning. And while these rubber blade holders can be replaced, their replacement is costly in terms of materials and productivity. With the preferred, two crossbar configurations of this invention, rubber blade mount breakage is less likely to happen.

DETAILED DESCRIPTION OF PREFERRED EMBODIMENTS

Figure 1:
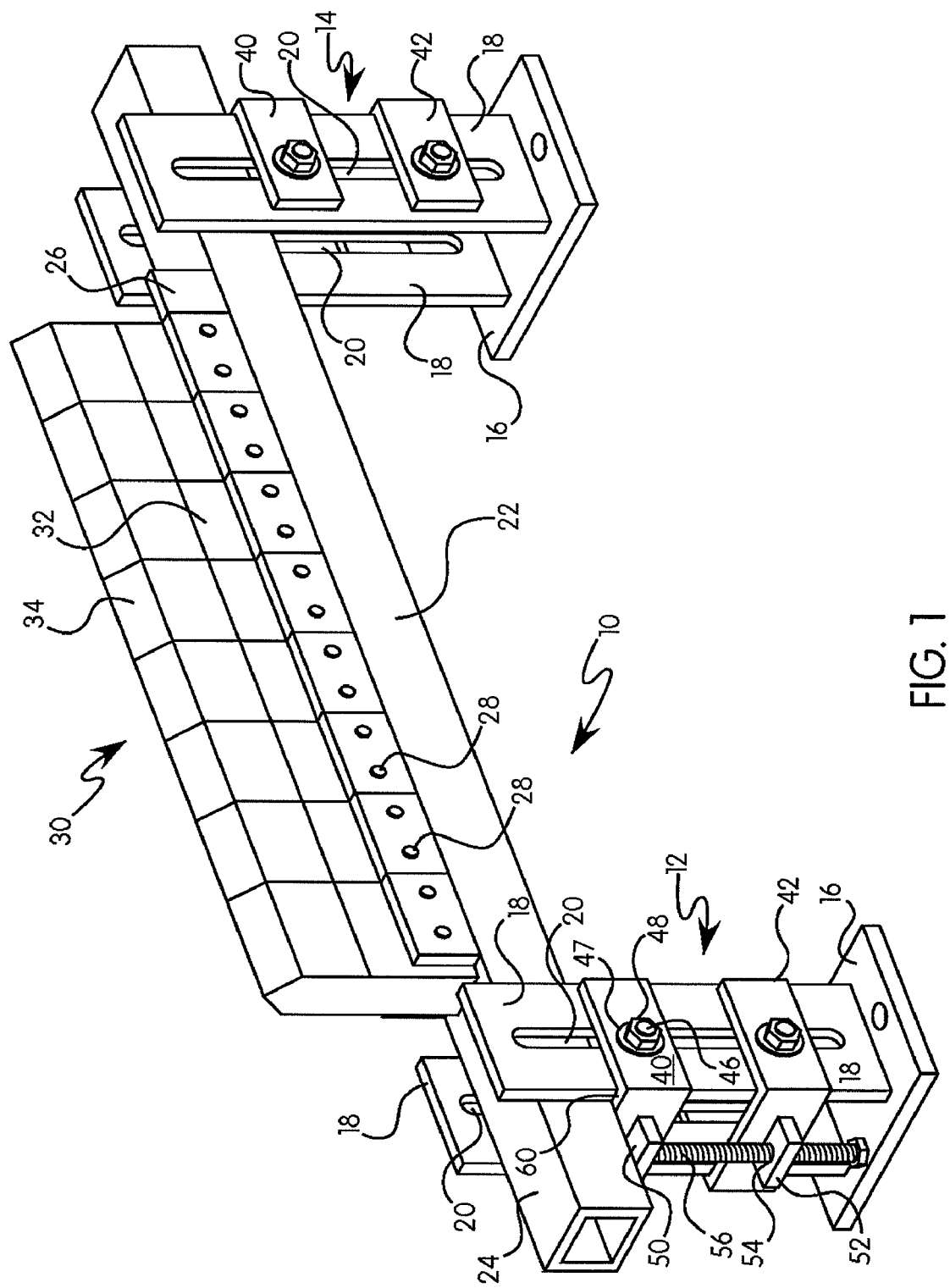
FIG. 1 is a perspective view of one embodiment of cleaner mount according to the invention with the cleaning blade frame and several cleaning blades situated therein.
Figure 2:
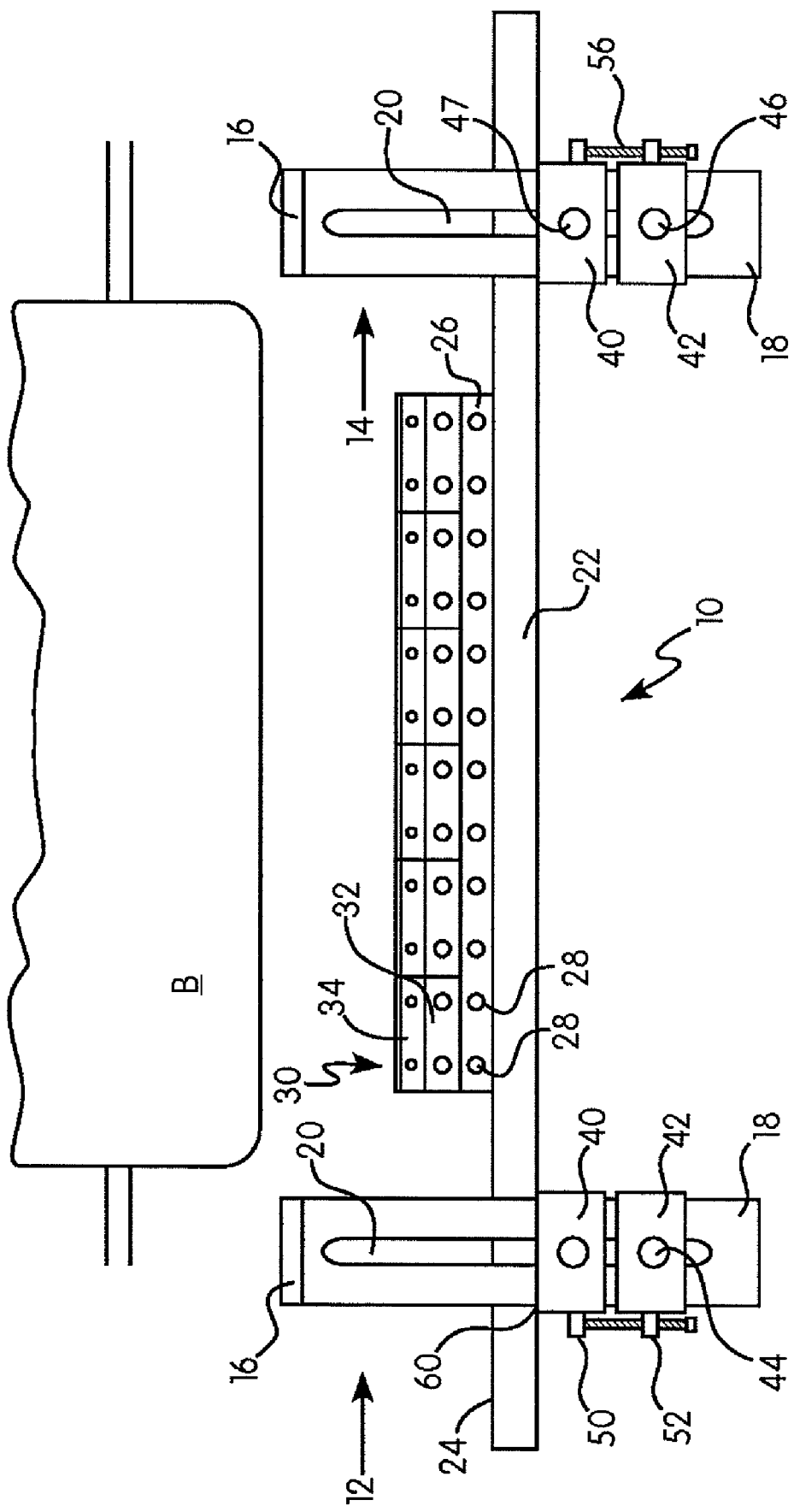
FIG. 2 is a front view of a cleaner mount with the mounting base reversed for a push-up type arrangement against a conveyor belt B.
Figure 3:
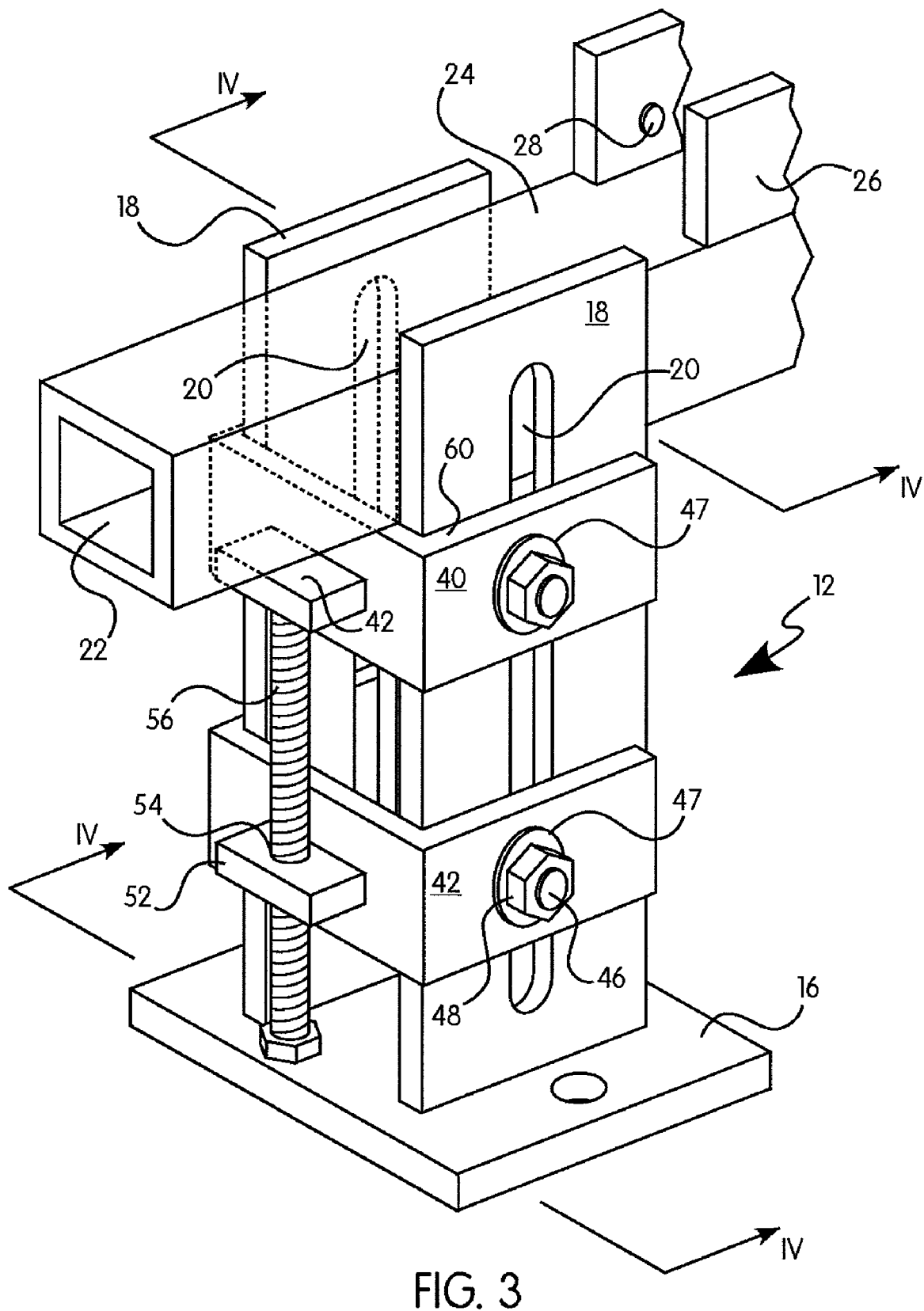
FIG. 3 is a perspective view of the left side cleaner mount from FIG. 1 showing the cleaning blade frame in partial cutaway.
Figure 4:
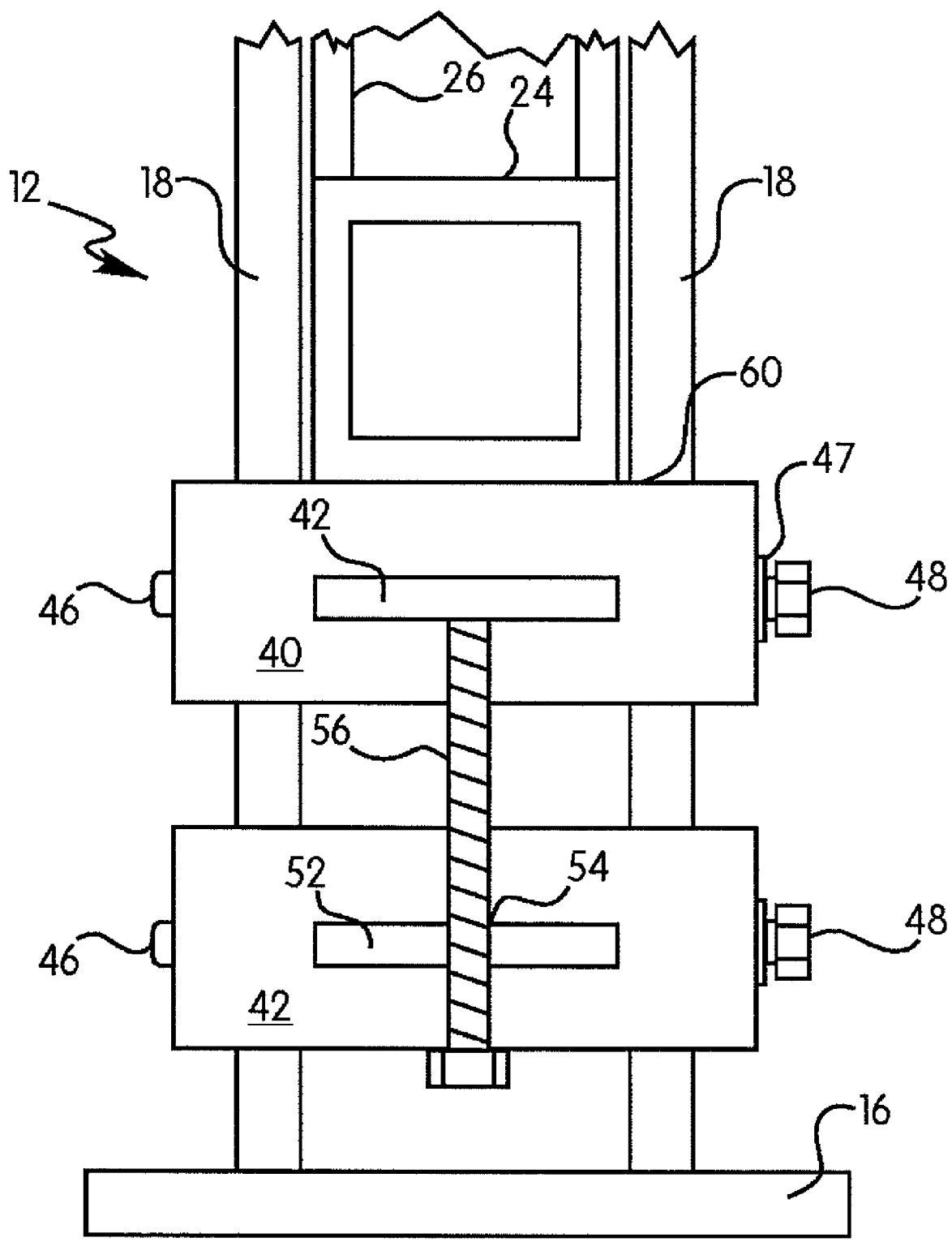
FIG. 4 is a left side elevational view of the cleaner mount as would be seen from lines IV-IV of FIG. 3.
Figure 5:
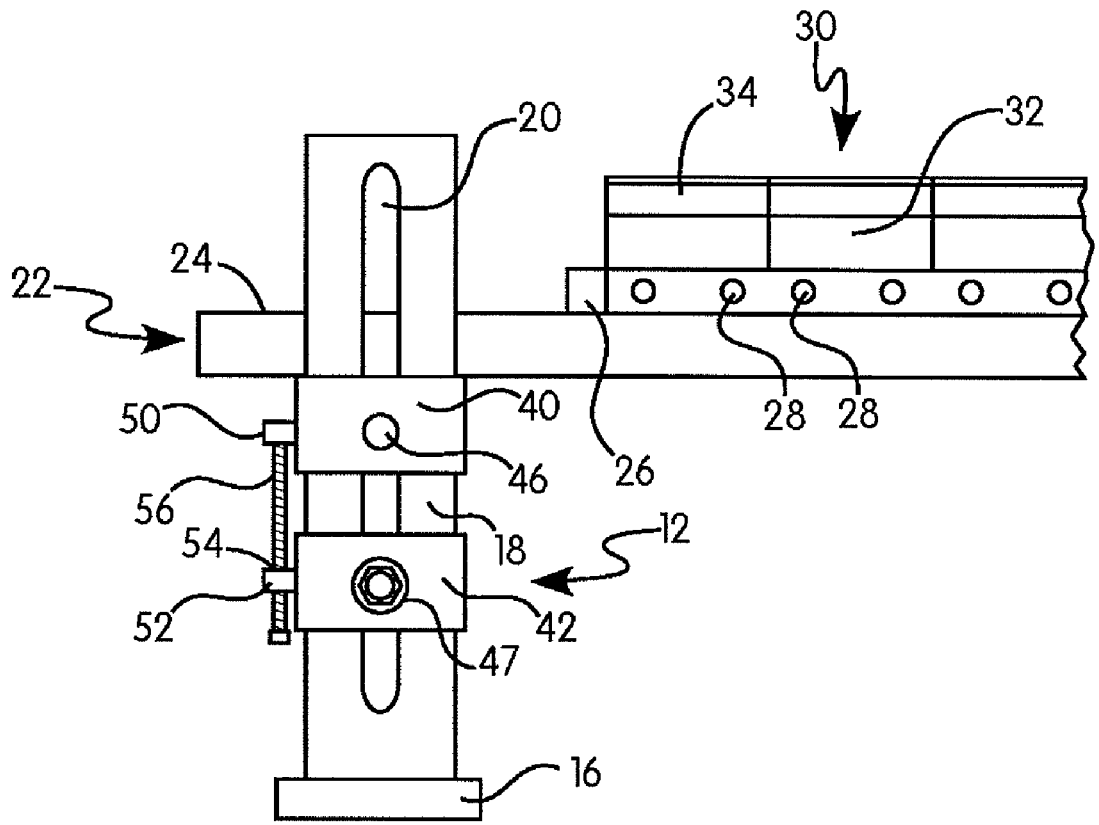
FIG. 5 is an enlarged front view of the left side cleaner mount from FIG. 1 with the cleaning blade frame and several cleaning blades in partial cutaway.
Figure 6:
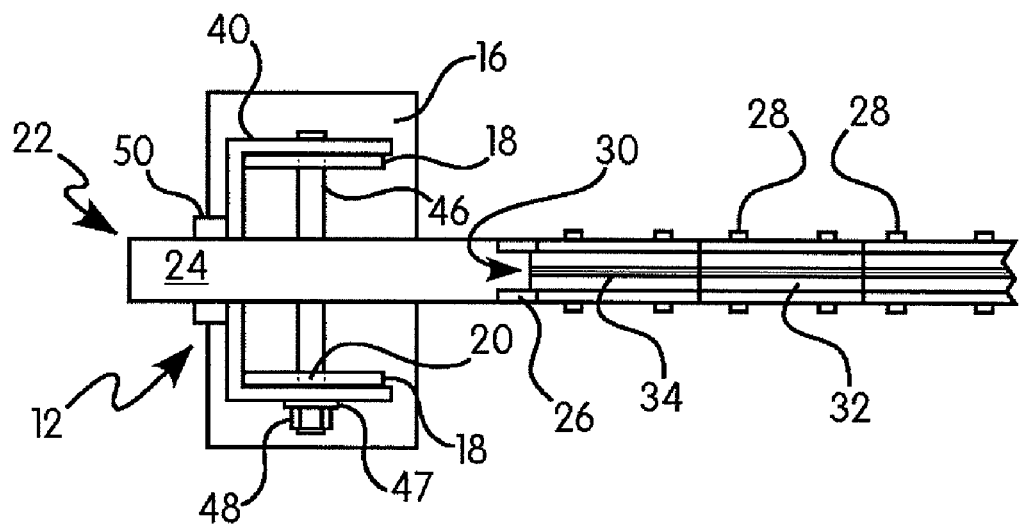
FIG. 6 is top view of the cleaner mount, partial cleaning blade frame and several cleaning blades from FIG. 5.
Figure 7:
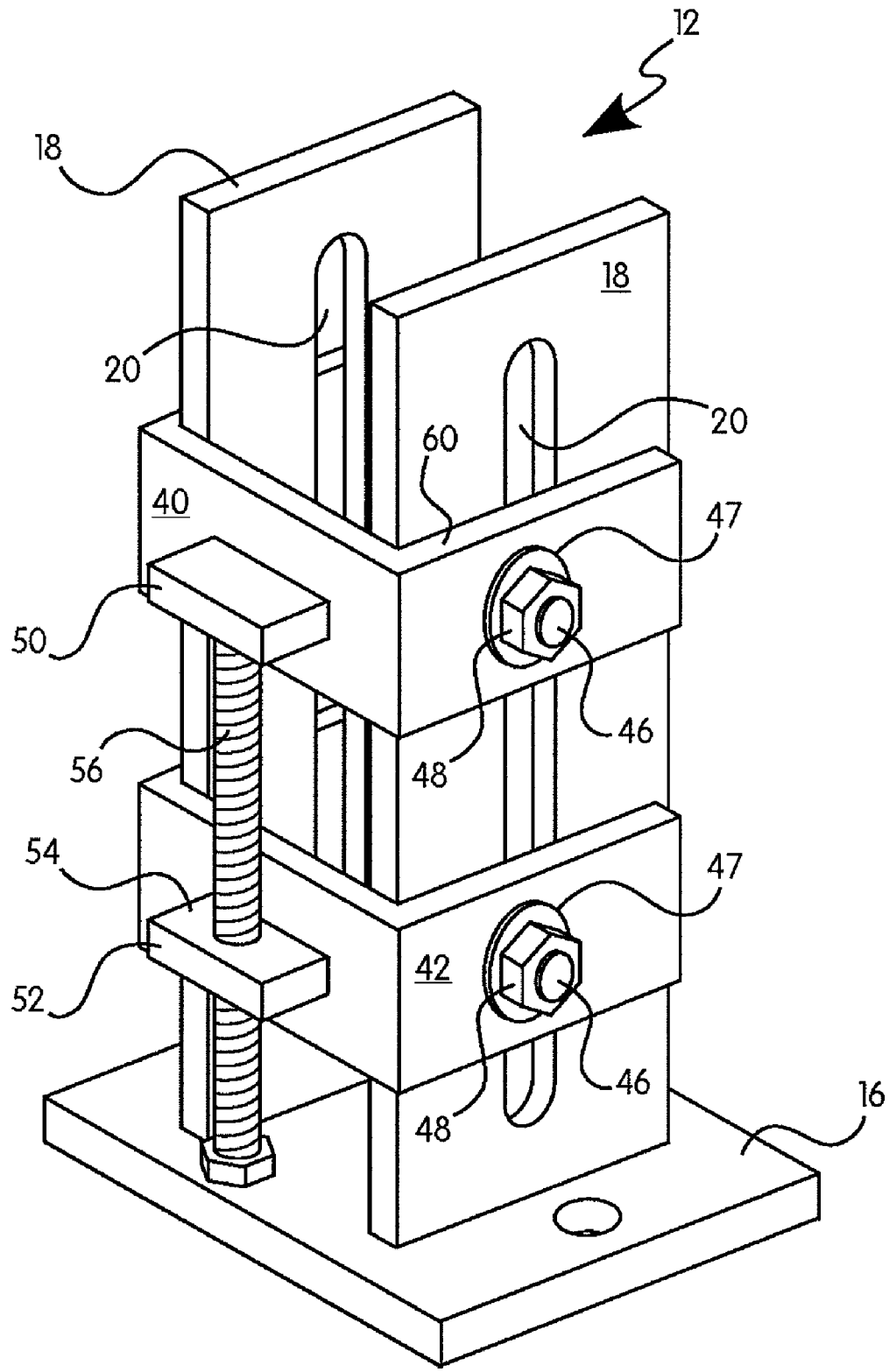
FIG. 7 is a perspective view of the left side cleaner mount from FIG. 1 with the cleaning blade frame removed for illustrative purposes.
Figure 8:
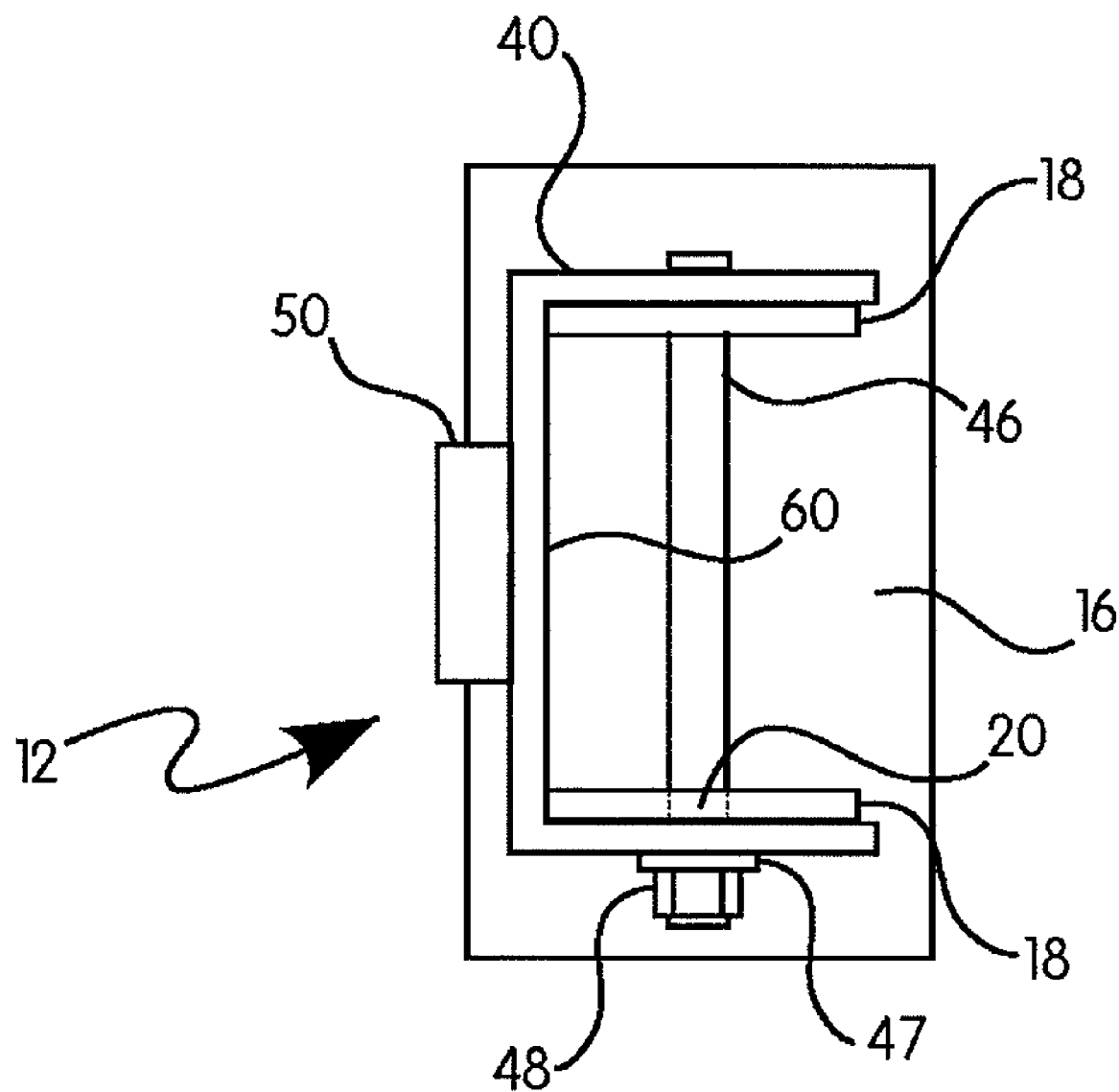
FIG. 8 is a top view of the left side cleaner mount from FIG. 7.

In FIGS. 1 through 12, a secondary cleaning system 10 for a conveyor belt in accordance with one preferred embodiment of this invention is illustrated. The cleaning system, generally 10, includes a pair of side brackets 12 and 14 for positioning on either side of a conveyor belt, shown for relative positioning as component B in FIG. 2. Each side bracket 12 and 14 has a mounting base 16 from which a pair of slotted arms 18 outwardly extends. The slots 20 in each slotted arm pair 18 align for receiving one or more bolts to connect other cleaner mount components to the side brackets 12 and 14.

Figure 9:
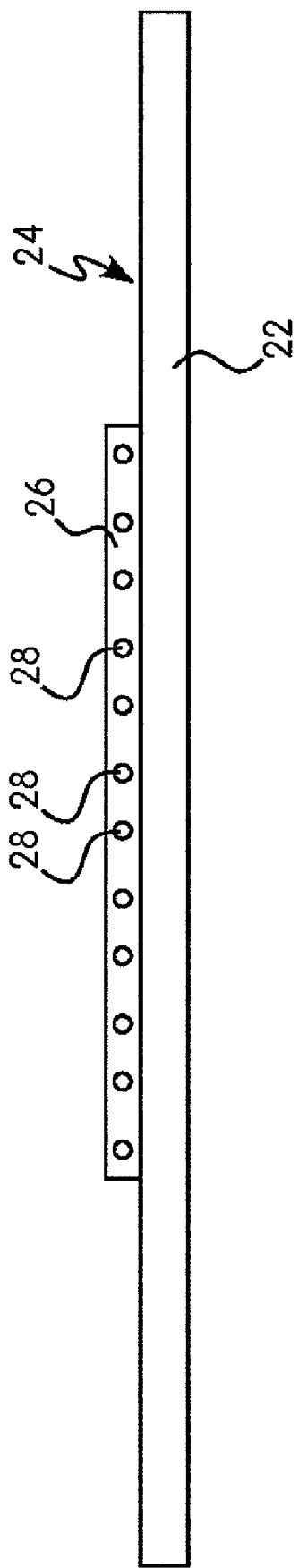
FIG. 9 is a front view of a preferred rectangular cleaning blade frame for use with the present invention.
Figure 10:
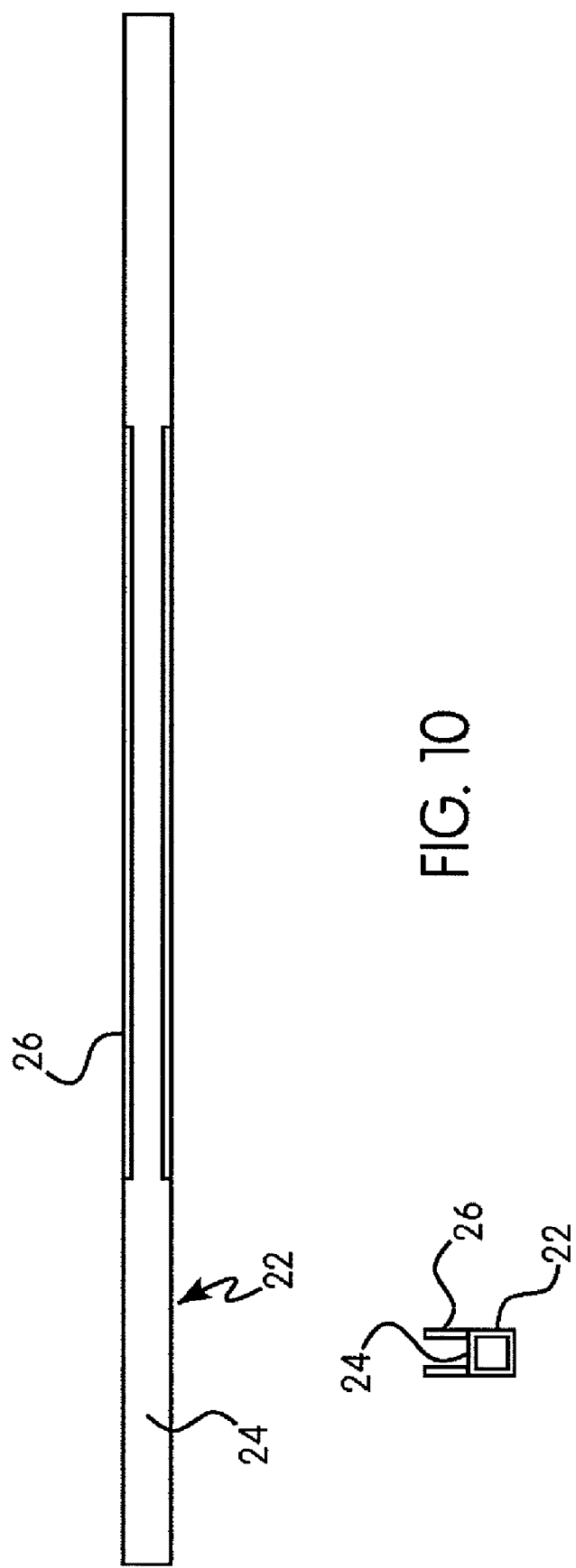
FIG. 10 shows top and side views of the cleaning blade frame from FIG. 9.

The slotted arms 18 of preferred embodiments are spaced apart a set distance that should approximate the width of a cleaning blade, frame bar 22. As best seen in FIGS. 9 and 10, frame bar 22 is rectangularly shaped, preferably square in cross section. One embodiment of frame bar 22 is made from a hollow metal extrusion. With a non-circular cross-section, frame bar 22 will not rotate between surrounding frame components thereby adding some directional integrity to the plurality of cleaning blades positioned on that frame bar 22.

The value of a hollow square channel for frame bar 22 is threefold: first, a flat channel will not spin backwards (a round bar, held on by pipe clamps like some prior art devices, is more prone to spinning and, hence, more difficult to install and require more maintenance. Secondly, for some heavier duty applications, a pipe can be further run through the middle of this preferred hollow square channel to frame bar 22. In that manner, strength may be added to said frame bar as the need arises. A central reinforcement to the outer, square bar can be easily made and shipped. The center reinforcement "rod" can be secured with a bolt on each end, even while the rest of this cleaner is installed, and running. Thirdly, with the aforementioned frame size and shape, a smaller width profile cleaner is possible. By eliminating the need for bulky pipe clamps, the cleaner of this invention can be mounted into smaller, tighter areas including those under the "return side" of an industrial conveyor belt. This design is thinner than prior art equivalents by several inches. And with external adjustment, this invention avoids the problem of most pipe clamp designs which have their adjusters located in the tightest areas to access once they are installed on the conveyor proper.

Extending upwardly from a flat plane, typically the top surface 24 of frame bar 22, are two or more mounting crossbar connectors 26. Preferably, these connectors 26 have a plurality of apertures 28 for bolting to an array of several cleaning blades 30. The blades 30 depicted in FIGS. 1, 2, 5 and 6 are illustrative only. Each blade 30 has a rubberized base 32 from the top of which a metal component 34 extends for scraping the surface of a conveyor belt against which metal component 34 is tensioned. Preferably, metal component 34 is a tungsten carbide element having a purposefully pitch, or angled top. The blade can also be coated, with a tool coating for example, to improve and reduce the need for and cost of replacements. Rubberized base 32 is preferably comprised of urethane, although other rubber products can be used.

Figure 14:
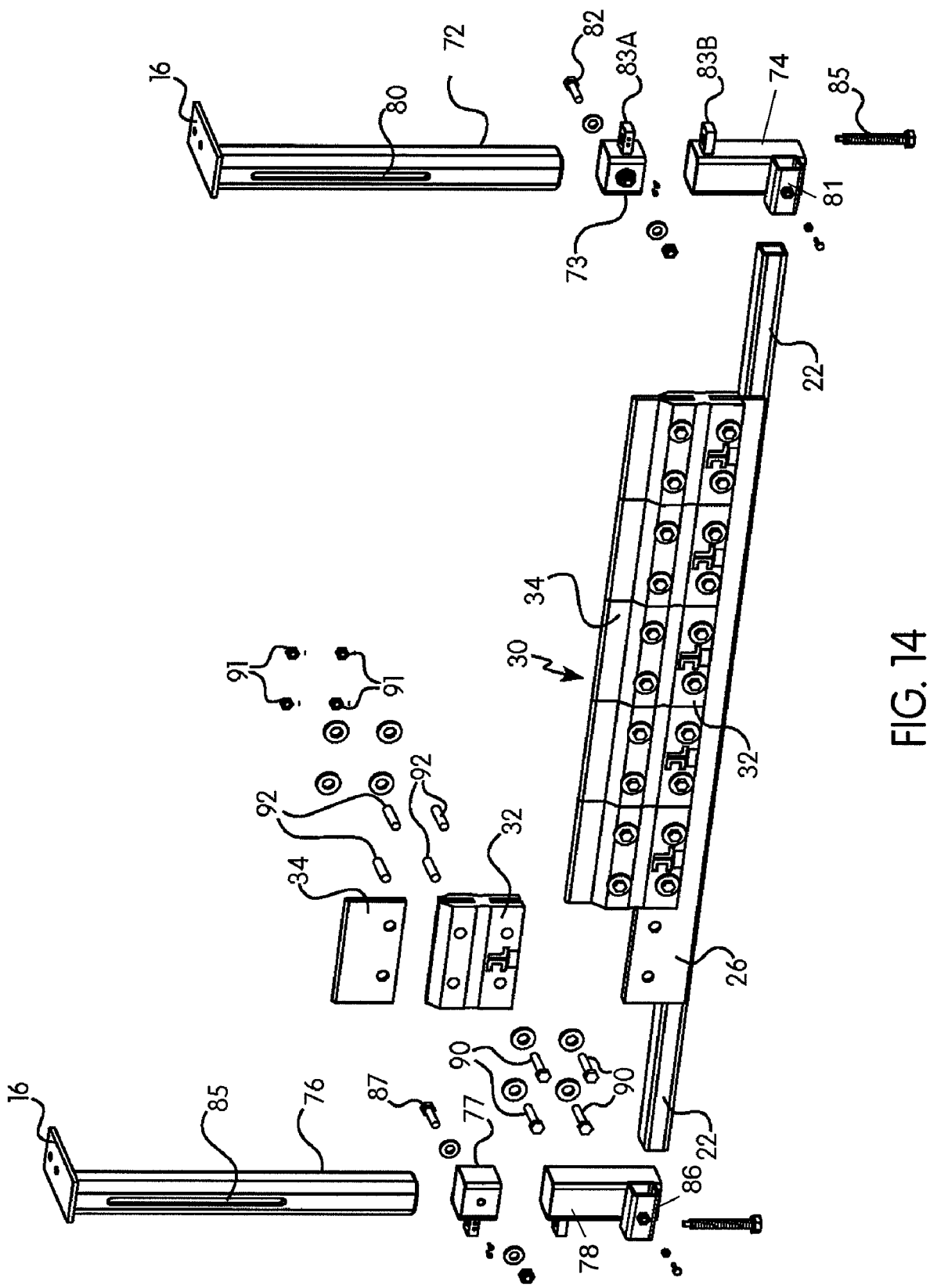
FIG. 14 is an exploded view of the cleaner mount from FIG. 13.

As a further alternative, a crush limiter system can be used to help attach the metal blade components to the base and the base to the frame so that the connecting bolts are not over tightened (whereby the base is "crushed"). In particular, as shown in FIG. 14, metal blade components 34 are attached to bases 32 and bases 32 are attached to connector 26 by use of threaded bolts 90 and nuts 91. Bolts 90 and nuts 91 pass through crush limiting sleeves 92 that, in turn, pass through the apertures in the metal components 34, base 32 and connector 26. Sleeves 92 are made of a solid material and have a defined length that limits the ability of nuts 91 to screw into and crush base 32. Limitation on the movement of bolts 90 can also be provided by limiting the length of the threading on the bolt.

Figure 11:
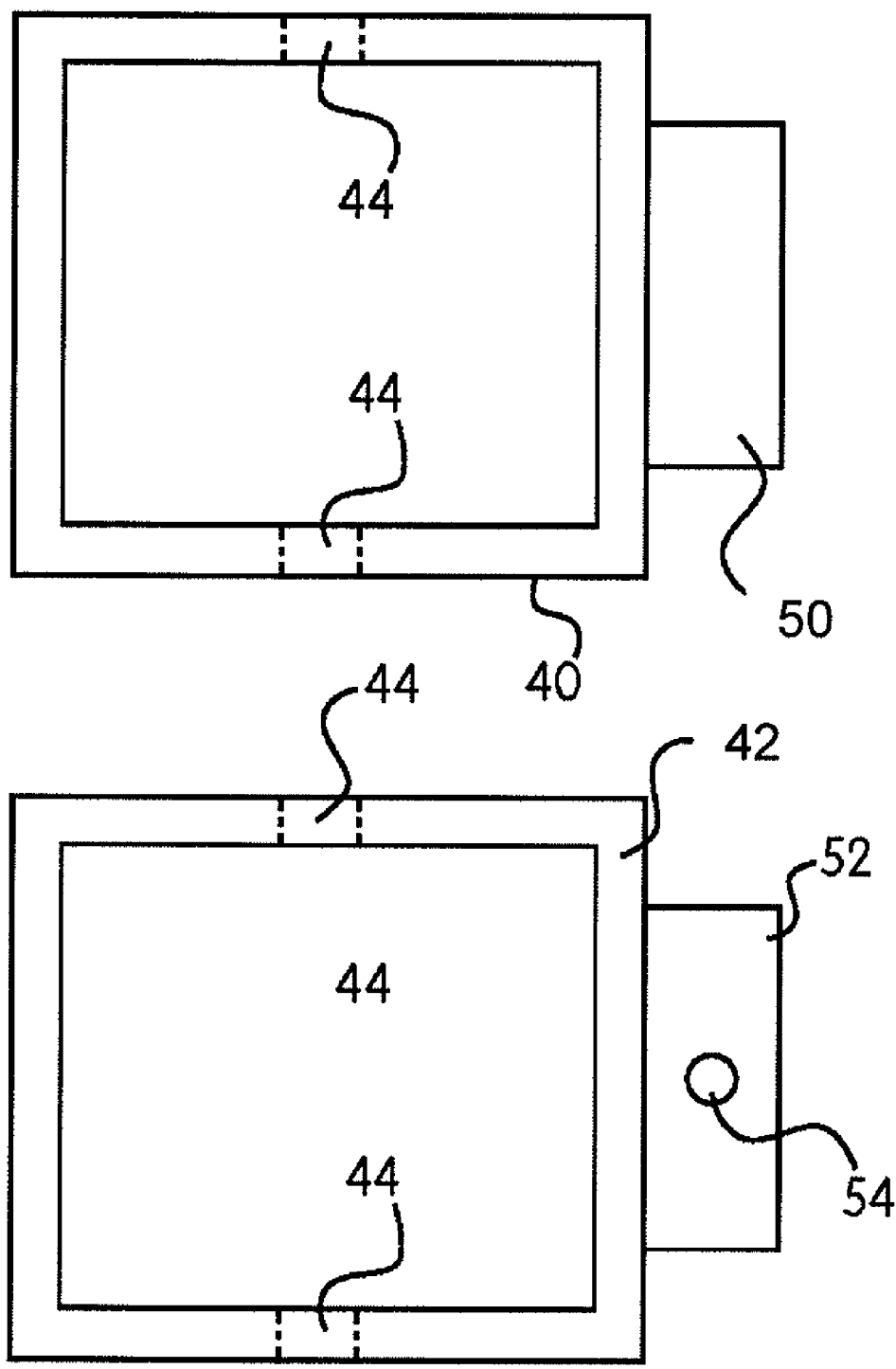
FIG. 11 is a top view of the first and second C-clamp components for one preferred embodiment of this invention.
Figure 12:
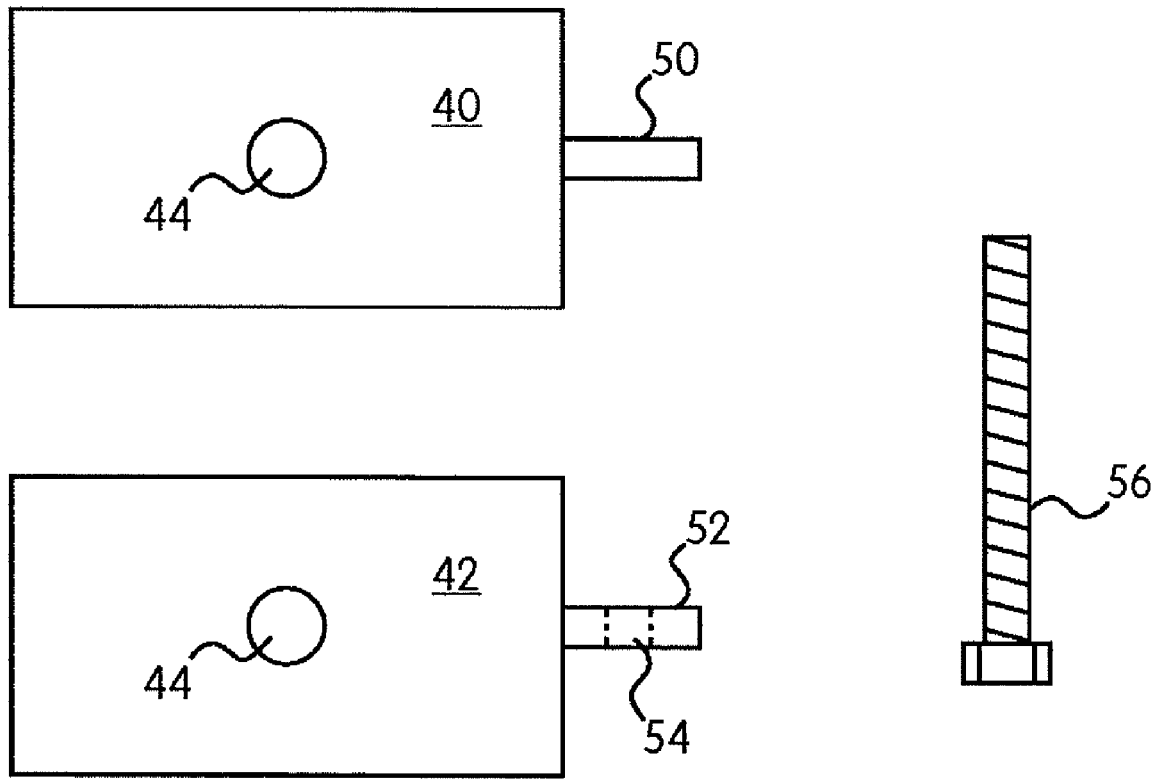
FIG. 12 is a front view of the first and second C-clamps from FIG. 11 with the adjustment bolt to be used for joining said C-clamps together.

Referring to FIGS. 1 through 8, a pair of C-clamps joins together each side bracket 12 and 14 according to this invention. FIGS. 11 and 12 depict one preferred embodiment of C-clamps. As shown, there is a first, or upper C-clamp 40, beneath which is situated a second, or lower clamp 42. Both clamps are straight edged for better fitting against the outside edges of side brackets 12 and 14. In an alternative embodiment, not shown, C-clamps could be made more boxlike and not open-ended. Such an alternative clamping means would require installing over the slotted arms of each side bracket 12 and 14 before being raised or lowered in place for mounting. Afterwards, a fully boxed clamp could be slid vertically along the side bracket pair it is connecting, but not move horizontally, laterally, or otherwise fully separate from said side bracket pair.

As seen in FIGS. 11 and 12, clamps 40 and 42 each have an aperture 44 through which a threaded bolt 46, washer 47 and nut 48 (see FIG. 1) are cumulatively used for attaching same through the slot 20 (see FIG. 1) in each respective side bracket 12 and 14 (see FIG. 1). Clamps 40 and 42 further interconnect to one another, external to the conveyor belt mounting system proper. Particularly, upper clamp 40 has an external ledge or lip 50 with a correspondingly positioned ledge or lip 52 on the exterior to lower clamp 42. Preferably, one of those two lips has a threaded aperture 54 through which a bolt 56 extends for finely adjusting the distance clamp 40 is spaced from clamp 42. By gradually turning bolt 56 in one direction or the other, the relative position of frame bar 22 against the conveyor belt can be manually adjusted. More importantly, such adjustments can be performed from a region external to the conveyor belt, while the belt is in motion. In this manner, the invention may keep the blades 30 on its frame bar 22 duly tensioned against the belt, without the need for spring-like tensioner systems of the prior art. In alternative embodiments, both upper clamp lip 50 and lower clamp lip 52 may be threaded for extending threaded bolt 56 there through. Still other interconnecting means may be employed for finely adjusting the preset gap between the uppermost ledge 60 (see FIG. 1) of upper clamp 40 against which the lower end of frame bar 22 "rides".

Figure 13:
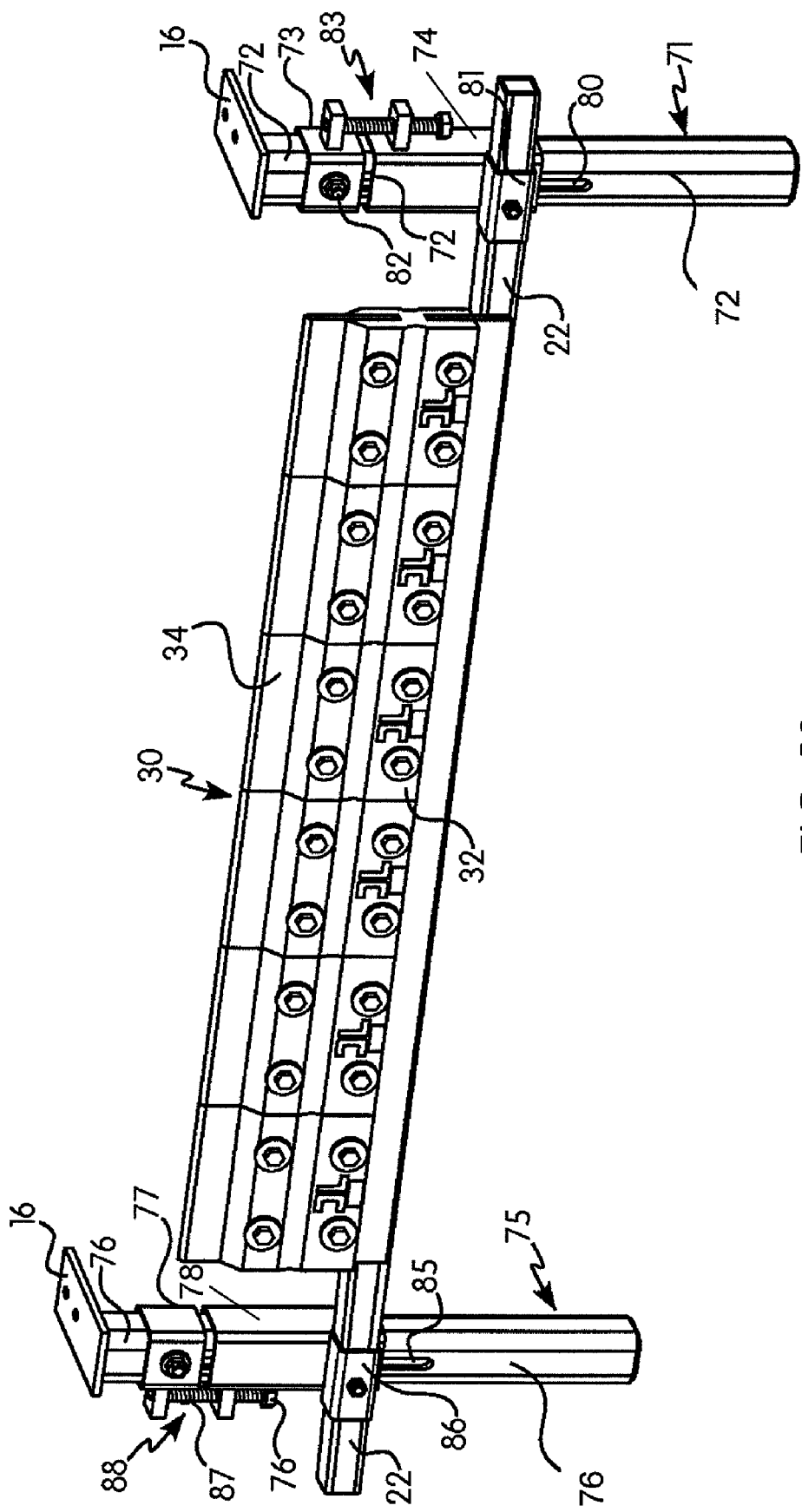
FIG. 13 is a perspective view of another embodiment of the cleaner mount according to the present invention.
Figure 15:
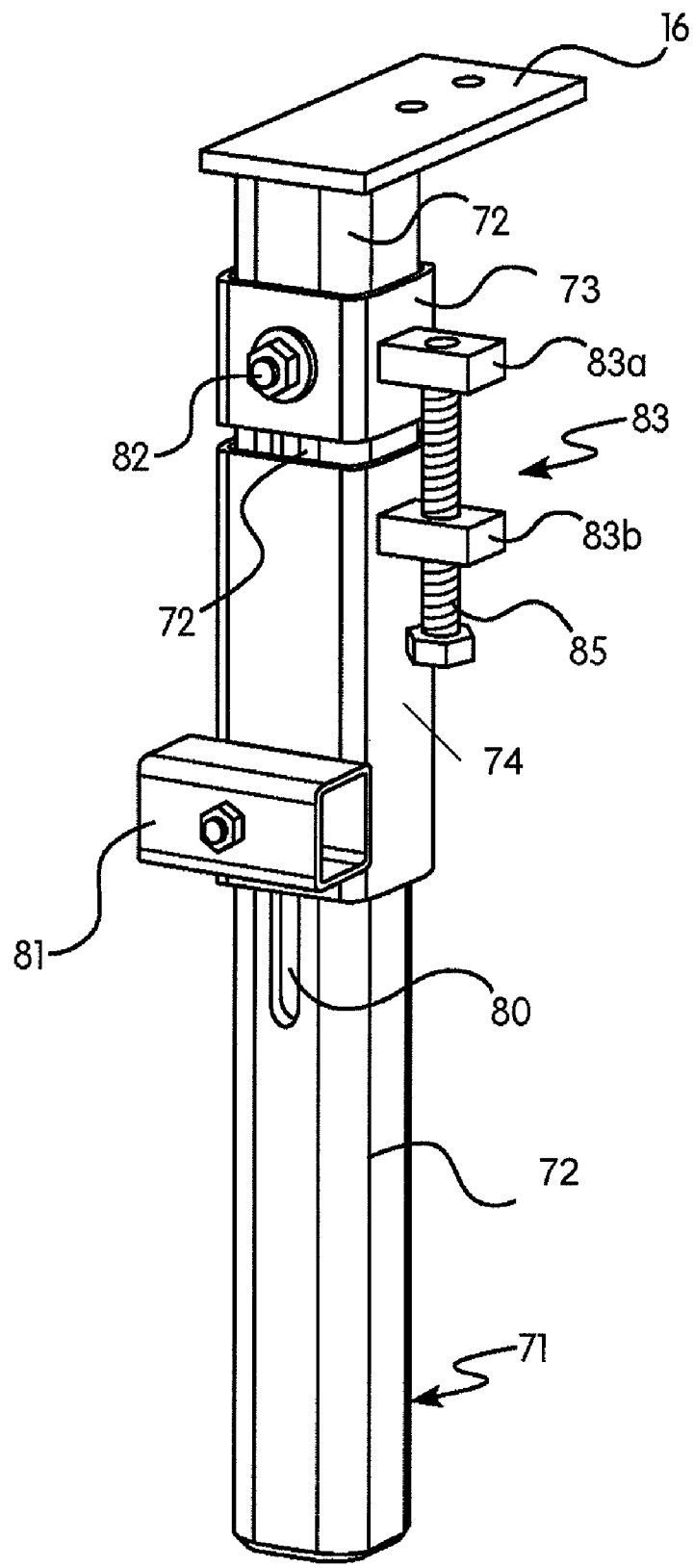
FIG. 15 is a perspective of one side of the cleaner mount from FIG. 13.

FIGS. 13-15 show an alternative embodiment of the present invention wherein the slotted arms and C-clamp bracket design are replaced by a pair of telescoping structural tube assemblies or brackets 71 and 75 that serve as a mount for the main blade frame bar 22 and allow for adjustment of frame positioning. In particular, each telescoping structuring tube assembly or bracket 71 and 75 is comprised respectively of inner tube members 72 and 76 that slidably telescopes into upper tube members 73 and 77, respectively, and lower outer tube members 74 and 78, respectively. The main blade frame bar 22, along with blades 30, bases 32 and metal components 34 remain the same in each embodiment. Tubular mounts 81 and 86 are attached, respectively, to lower outer members 74 and 78 and receive the ends of frame bar 22 so as to mount frame bar 22 to lower outer members 74 and 78. Preferably, tubular mounts 81 and 86 have a rectangular cross section and thereby interact with the rectangular cross section of frame bar 22 to prevent rotation of the frame bar 22 and the attached blades 30.

Inner tube members 72 and 76 each have a slot 80 and 85, respectively, on the sides of these members that faces mount frame bar 22, as well as slots on the opposite sides of members 72 and 76. Slots 80 and 85 and the opposite slots on the back of members 72 and 76 allow clamping bolts 82 and 87 to pass through inner tube members 72 and 76 and upper tube members 73 and 77 respectively and attach these upper tube members 73 and 77 to these inner tube members 72 and 76. Slots 80 and 85 allow for adjustment of the position of upper tube members 72 and 76 before they are secured to inner tube members 73 and 77.

Lower tube members 74 and 78 slide on inner tube members 72 and 76 and the position of the lower tube members 74 and 78 in respect to upper tube members 73 and 77 is adjusted by for that can be adjusted in respect to each other by a bolt or screw adjustment that interacts with both outer tube members. The main blade frame bar 22 is attached to the lower tube members 74 and 78 and can be adjusted as the position of the two outer tube members 73 and 77 is adjusted by adjustment systems 83 and 88. Referring to FIG. 15 as an example, adjustment system 83 is comprised of mounts 83a and 83b that are attached to upper and lower tube members 73 and 74, respectively. Threaded bolt or screw 85 passes through mounts 83b and threadably attaches to mount 83a such that turning of bolt or screw 85 causes the horizontal location of mount 83b, along with lower tube member 74 and frame bar 22 to adjust. This same operation applies to adjustment system 88 and lower tube member 78. Adjustment systems 83 and 88 are preferably mounted on the outside of tube assemblies 71 and 75 and away from the blades 30 mounted on frame bar 22. This allows for fine adjustment of the frame position and is easily accessed by a user. Also this adjustment means is independent of the means by which frame bar 22 is mounted to the tube assemblies 71 and 75 (and the anti-rotation mounting system associated therewith).

Significantly, in this second embodiment, the tube brackets can be mounted upright or upside down thereby allowing for a universal application. Preferably the tube brackets are comprised of metal, such as steel or steel alloys.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:
1. A secondary system for cleaning a conveyor belt running between conveyor pulleys, the secondary system comprising:
    a frame bar;
    two bracket assemblies spaced apart and adjustably mountable to the frame bar therebetween, wherein each bracket assembly of the two bracket assemblies comprises:
    an inner tube member,
    a first outer tube member and a second outer tube member,
        wherein the second outer tube member comprises an attachment mechanism to retain the frame bar;
        wherein the first outer tube member and the second outer tube member each comprise a longitudinal through-bore and an external side, wherein the longitudinal through-bore is sized to receive the inner tube member for slideably positioning the frame bar along the inner tube member to a first position for close proximity of the frame bar to the conveyor belt,
        wherein the second outer tube member is free to slide relative to the first outer tube member when both outer tube members are slideably engaged with the inner tube member;

wherein the first outer tube member and the second outer tube member further comprise a fine frame bar adjustment system mounted on the external sides of the first outer tube member and the second outer tube member to adjust and retain a distance between the first outer tube member relative to the second outer tube member for positioning the frame bar to a second position for closer proximity of the conveyor belt than the first position, a cleaning blade assembly including (i) two or more mounting crossbar connectors and one or more rubberized bases, wherein each mounting crossbar connector of the two or more mounting crossbar connectors is partially disposed within the one or more rubberized bases, (ii) one or more metal cleaning blades, wherein each metal cleaning blade of the one or more metal cleaning blades is partially disposed within the one or more rubberized bases; (iii) wherein the two or more mounting crossbar connectors, the one or more rubberized bases, and the one or more metal cleaning blades each include one or more apertures, and (iv) wherein the two or more mounting crossbar connectors are mountable to the frame bar; and cleaning blade assembly attachment hardware including bolts and nuts to cooperate with the one or more apertures (i) to mount together the cleaning blade assembly and (ii) to mount the two or more mounting crossbar connectors to the frame bar.

2. The secondary belt cleaner of claim 1, wherein the two bracket assemblies and the frame bar have rectangular cross-sections so that when mounted together, rotational movement of the frame bar, about its longitudinal axis, is restricted.

3. The secondary belt cleaner of claim 1, wherein the inner tube member telescopes into the two outer tube members, wherein the first outer tube member can be adjustably clamped to both the inner tube member and to the second outer tube member.

4. The secondary belt cleaner of claim 3, wherein the frame bar can be further adjusted from the second position to a third position by moving the second outer tube member relative to the first outer tube member by use of the fine frame bar adjustment system.

5. The secondary belt cleaner of claim 1, wherein the one or more rubberized bases are comprised of urethane.

6. The secondary belt cleaner of claim 1, further comprising a crush limiting system that is utilized in connection with the mounting of the metal blade component on the one or more rubberized bases and the mounting of the base on the frame bar, wherein the crush limiting system comprises a threaded section of the bolts having a predetermined threaded length section that limits movement of the bolts, and thereby the nuts are prohibited from crushing the one or more rubberized bases.

7. The secondary belt cleaner of claim 1, further comprising a crush limiting system that is utilized in connection with the mounting of the metal cleaning blades on the one or more rubberized bases and the mounting of the one or more rubberized bases on the frame bar, wherein the crush limiting system comprises hollow sleeves, wherein each hollow sleeve has an inner diameter sized to receive a bolt of the bolts therein and an outer diameter sized to be received within an aperture of the one or more apertures, wherein the hollow sleeves are made of a solid material and have defined lengths that limit the ability of the nuts to screw onto the bolts, whereby the nuts are prohibited from being screwed into the base, and thereby the nuts are prohibited from crushing the one or more rubberized bases.

8. A secondary system for cleaning a conveyor belt running between conveyor pulleys, the secondary system comprising:
a frame bar;
two bracket assemblies adjustably mountable to the frame bar, wherein each bracket assembly of the two bracket assemblies has an external side, wherein each bracket assembly of the two bracket assemblies comprises:
an inner tube member
a first outer tube member and a second outer tube member,
wherein the second outer tube member comprises an attachment mechanism to retain the frame bar;
wherein the first outer tube member and the second outer tube member each comprise a longitudinal through-bore and an external side, wherein the longitudinal through-bore is sized to receive the inner tube member for slideably positioning the frame bar along the inner tube member to a first position for close proximity of the frame bar to the conveyor belt,
wherein the second outer tube member is free to slide relative to the first outer tube member when both outer tube members are slideably engaged with one the inner tube member;
wherein the first outer tube member and the second outer tube member further comprise a fine frame bar adjustment system mounted on the external sides of the first outer tube member and the second outer tube member to adjust and retain a distance between the first outer tube member relative to the second outer tube member for positioning the frame bar to a second position for closer proximity of the conveyor belt than the first position,
a mounting crossbar connector attached to the frame bar, wherein the mounting crossbar connector includes apertures;
a cleaning blade assembly having apertures;
cleaning blade assembly attachment hardware including bolts and nuts to cooperate with the apertures to mount the cleaning blade assembly to the mounting crossbar connector; and
a crush limiting system that is utilized in connection with the mounting of the cleaning blade assembly to the mounting crossbar connector, wherein the crush limiting system comprises a threaded section of the bolt having a predetermined threaded length section that limits movement of the bolt, and thereby the nuts are prohibited from crushing the cleaning blade assembly.

9. A secondary system for cleaning a conveyor belt running between conveyor pulleys, the secondary system comprising:
a frame bar;
two bracket assemblies adjustably mountable to the frame bar, wherein each bracket assembly of the two bracket assemblies has an external side, wherein each bracket assembly of the two bracket assemblies comprises:
an inner tube member,
a first outer tube member and a second outer tube member,
wherein the second outer tube member comprises an attachment mechanism to retain the frame bar;
wherein the first outer tube member and the second outer tube member each comprise a longitudinal through-bore and an external side, wherein the longitudinal through-bore is sized to receive the inner tube member for slideably positioning the frame bar along the inner tube member to a first position for close proximity of the frame bar to the conveyor belt,
wherein the second outer tube member is free to slide relative to the first outer tube member when both outer tube members are slideably engaged with the inner tube member;
wherein the first outer tube member and the second outer tube member further comprise a fine frame bar adjustment system mounted on the external sides of the first outer tube member and the second outer tube member to adjust and retain a distance between the first outer tube member relative to the second outer tube member for positioning the frame bar to a second position for closer proximity of the conveyor belt than the first position,
a mounting crossbar connector attached to the frame bar, wherein the mounting crossbar connector includes apertures;
a cleaning blade assembly having apertures;
cleaning blade assembly attachment hardware including bolts and nuts to cooperate with the apertures to mount the cleaning blade assembly to the mounting crossbar connector; and
a crush limiting system that is utilized in connection with the mounting of the cleaning blade assembly to the mounting crossbar connector, wherein the crush limiting system comprises hollow sleeves, wherein each hollow sleeve has an inner diameter sized to receive the bolt therein and an outer diameter sized to be received within an aperture of the apertures, wherein the hollow sleeves are made of a solid material and have defined lengths that limit the ability of the nuts to screw onto the bolts, whereby the nuts are prohibited from being screwed into the cleaning blade assembly, and thereby the nuts are prohibited from crushing the cleaning blade assembly.

10. A secondary system for cleaning a conveyor belt running between conveyor pulleys, the secondary system comprising:
a frame bar;
two bracket assemblies adjustably mountable to the frame bar, wherein each bracket assembly of the two bracket assemblies has an external side, wherein each bracket assembly of the two bracket assemblies comprises:
an inner tube member
a first outer tube member and a second outer tube member,
wherein the second outer tube member comprises an attachment mechanism to retain the frame bar;
wherein the first outer tube member and the second outer tube member each comprise a longitudinal through-bore and an external side, wherein the longitudinal through-bore is sized to receive the inner tube member for slideably positioning the frame bar along the inner tube member to a first position for close proximity of the frame bar to the conveyor belt,
wherein the second outer tube member is free to slide relative to the first outer tube member when both outer tube members are slideably engaged with the inner tube member;
wherein the first outer tube member and the second outer tube member further comprise a fine frame bar adjustment system mounted on the external sides of the first outer tube member and the second outer tube member to adjust and retain a distance between the first outer tube member relative to the second outer tube member for positioning the frame bar to a second position for closer proximity of the conveyor belt than the first position,
two opposing mounting crossbar connectors forming a gap therebetween, wherein each mounting crossbar connector two opposing mounting crossbar connectors is attached to the frame bar along a longitudinal plane of the frame bar, wherein the two mounting crossbar connectors includes apertures; and
a cleaning blade assembly disposed in the gap and attached to the two opposing mounting crossbar connectors.

11. The secondary system according to claim 10, further comprising:
cleaning blade assembly attachment hardware including bolts and nuts to cooperate with the apertures to mount the cleaning blade assembly to the mounting crossbar connector; and
a crush limiting system that is utilized in connection with the mounting of the cleaning blade assembly to the two opposing mounting crossbar connectors, wherein the crush limiting system comprises a threaded section of a bolt of the bolts having a predetermined threaded length section that limits movement of the bolt, and thereby the nuts are prohibited from crushing the cleaning blade assembly.

12. The secondary system according to claim 10, further comprising:
cleaning blade assembly attachment hardware including bolts and nuts to cooperate with the apertures to mount the cleaning blade assembly to the mounting crossbar connector; and
a crush limiting system that is utilized in connection with the mounting of the cleaning blade assembly to the two opposing mounting crossbar connectors, wherein the crush limiting system comprises hollow sleeves, wherein each hollow sleeve has an inner diameter sized to receive a bolt therein and an outer diameter sized to be received within an aperture of the apertures, wherein the hollow sleeves are made of a solid material and have defined lengths that limit the ability of the nuts to screw onto the bolts, whereby the nuts are prohibited from being screwed into the cleaning blade assembly, and thereby the nuts are prohibited from crushing the cleaning blade assembly.

13. A secondary system for cleaning a belt running between conveyor pulleys, the secondary system comprising:
a frame bar; and
two bracket assemblies to retain and to position the frame bar a distance from the belt,
wherein each bracket assembly comprises an inner tubular member, a first outer tubular member, a second outer tubular member, and a frame bar retention member attached to the second outer tubular member to retain the frame bar between the two bracket assemblies, and
wherein the first outer tubular member and the second outer tubular member both are independently slidably engageable with the inner tubular member to position the frame bar in close proximity to the belt a fine frame bar adjustment mechanism connected to the first outer tubular member and the second outer tubular member to adjust and retain the first outer tubular member and the second outer tubular member at a distance between the first outer tubular member and the second outer tubular member, and wherein the fine frame bar adjustment mechanism is moveably connected relative to the inner tubular member to form a gross frame bar adjustment.

14. The secondary belt cleaner of claim 13, wherein the fine frame bar adjustment comprises an adjustment device mounted on external sides of the first outer tubular member and the second outer tubular member to moveably connect the first outer tubular member relative to the second outer tubular member.

15. The secondary belt cleaner of claim 13, wherein the two bracket assemblies and the frame bar have rectangular cross-sections so that when mounted together, rotational movement of the frame bar, about its longitudinal access, is restricted.

16. The secondary belt cleaner of claim 13, wherein the inner tubular member telescopes within the first outer tubular member and the second outer tubular member for gross adjustment of the frame bar relative to the belt.

17. The secondary belt cleaner of claim 13, wherein the frame bar can be adjusted from a first position to a second position by moving the second outer tubular member relative to the inner tubular member.

18. The secondary belt cleaner of claim 13, further comprising a base, wherein the cleaning blades are comprised of a metal blade component mounted on the base and the base is mounted on the frame bar.

19. The secondary belt cleaner of claim 18, wherein the base is comprised of urethane.

20. The secondary belt cleaner of claim 18, further comprising a crush limiting system that is utilized in connection with the mounting of the metal blade component on the base and of the base on the frame bar.

* * * * *